March 6, 1934.    R. L. ANDERSON    1,950,210
HARVESTER
Filed May 25, 1933
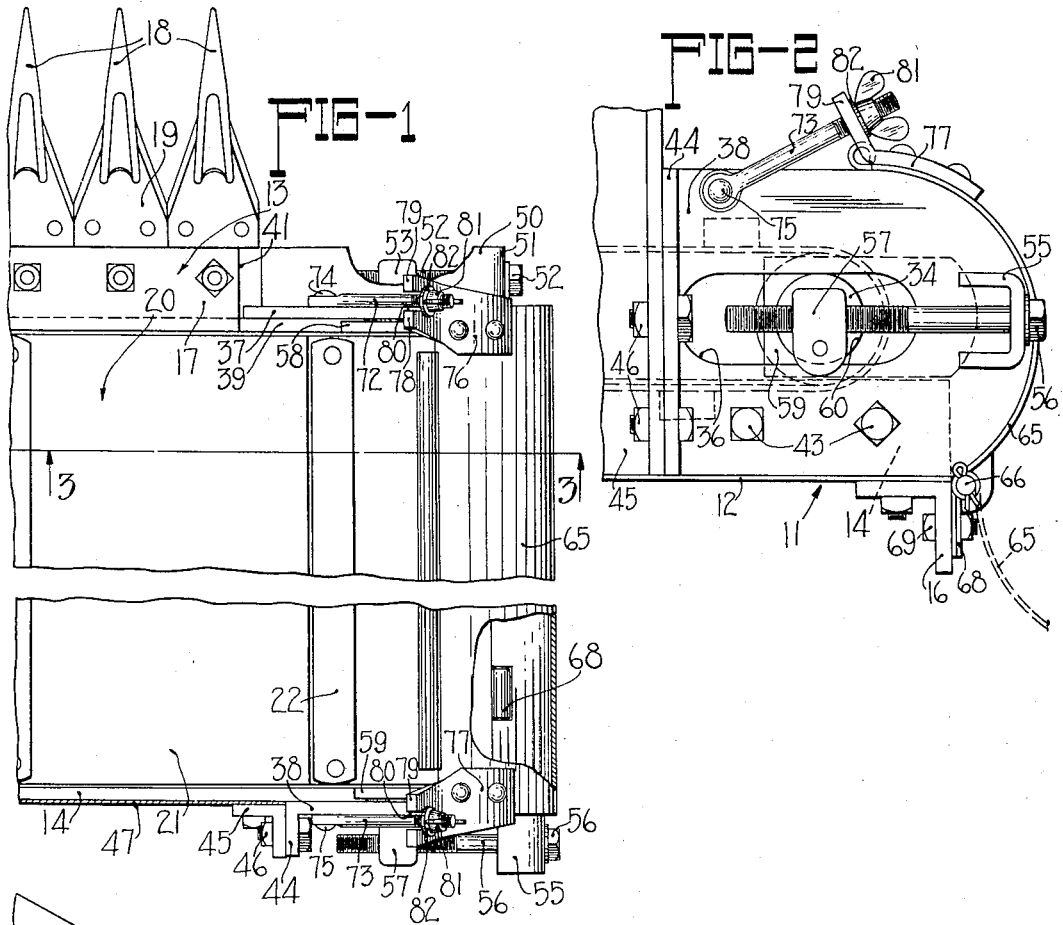
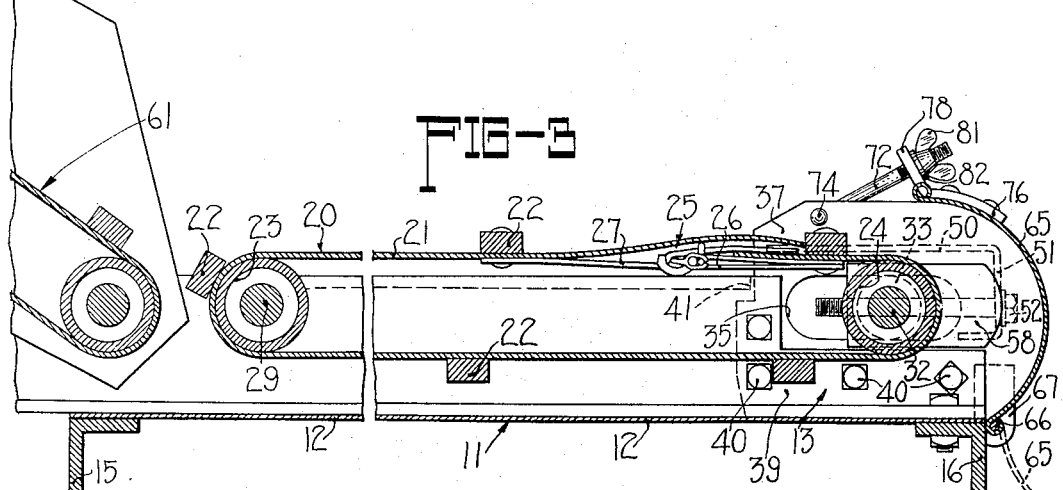

Patented Mar. 6, 1934

1,950,210

UNITED STATES PATENT OFFICE 1,950,210

HARVESTER

Ralph L. Anderson, Moline, Ill., assignor to Deere & Company, Moline, Ill., a corporation of Illinois Application May 25, 1933, Serial No. 672,756

2 Claims. (Cl. 56—207)

This invention relates to harvesters and more particularly to harvester-threshers, or combines, of the type wherein the harvester thereof comprises a platform having an imperforated bottom, a sickle disposed along the forward side of the platform, and a conveyor on the platform disposed in rear of the sickle for receiving grain cut by the sickle and for delivering it to one end of the platform to an elevator which conveys the grain to the thresher of the combine. The conveyor usually comprises a pair of rollers at opposite ends of the platform and a canvas belt trained thereover, the canvas belt operating with the upper run traveling in the direction towards the delivery end of the platform.

In combines of this kind, there is tendency for some grain to be carried around the delivery end of the conveyor upon the bottom of the platform and to be moved towards the opposite end by the lower run of the conveyor. To save this grain, it is usual to extend the bottom of the platform upwardly and around the end of the conveyor opposite the delivery end so that the grain carried toward this end by the lower run of the conveyor will be directed up and around the end of the conveyor and upon the upper run thereof. The ends of the canvas belt are usually connected together by means of buckles and straps, to facilitate removal of the canvas belt as occasion requires. The provision of the upwardly disposed extension of the bottom of the conveyor opposite the delivery end makes the operation of removing and of replacing the canvas a difficult one.

The main object of this invention is to substitute for the extension of the bottom of the conveyor heretofore provided for directing grain carried by the lower run of the conveyor towards the end of the conveyor opposite the delivery end upon the upper run of the conveyor, a shield of substantially semi-circular cross-section connected along the edge of the bottom of the platform at the end opposite the delivery end, with detachable means for holding the shield in operative position so that by detaching the holding means the shield may be displaced below the plane of the bottom of the platform to a position where it will not interfere with removing and replacing the canvas, thereby greatly facilitating this operation.

In the following specification I have described a preferred embodiment of my invention in connection with the accompanying drawing wherein:

Figure 1 is a fragmentary plan view of the harvester of a combine, showing the end opposite the delivery end thereof;

Figure 2 is an end view of that portion of the harvester shown in Figure 1; and, Figure 3 is a cross-sectional view along the line 3—3 of Fig. 1. This figure also includes a showing of the delivery end of the harvester.

The harvester disclosed comprises a platform 11 having an imperforated bottom 12 disposed between front and rear longitudinally extending frame members 13 and 14 connected by means of end frame members 15 and 16 and a number of similar intermediate frame members. Front frame member 13 is in the form of a Z-bar to the upper flange 17 of which a series of guard fingers 18 are connected. A sickle 19 is carried by the guard fingers and in cooperation with the guard fingers 18 forms the cutting mechanism of the harvester.

Disposed on the platform in rear of the cutting mechanism is a conveyor 20. This conveyor comprises a canvas belt 21 having slats 22 fixed thereto and trained over a driving roller 23 disposed at the delivery end of the platform and a driven roller 24 at the opposite end of the platform. The two ends of the canvas belt are detachably connected by means of several buckles 25 which are fixed to one end of the canvas belt by means of loops 26, and receive straps 27 fixed to the other end of the canvas belt. Roller 23 is fixed on a drive shaft 29 journaled in bearings carried by frame members 13 and 14. Rotative power may be applied to the drive shaft 29 in any suitable manner. Roller 24 is journaled on a shaft 32 which is supported at its opposite ends in a pair of cross-heads 33 and 34 slidably disposed in slots 35 and 36 formed in plates 37 and 38, respectively. Plate 37 is attached to the vertical flange 39 of Z-bar 13 by means of bolts 40. The forwardly extending flange 17 of Z-bar 13 is cut away as shown at 41 to permit plate 37 to extend above the Z-bar. Plate 38 is fixed to the vertical flange of frame member 14 by means of bolts 43. Plate 38 also has a rearwardly extending flange 44 which is bolted to the rearwardly extending flange of a vertical frame member 45 by means of bolts 46. Frame member 45 forms the support for carrying the usual wind-board 47 at the rear of the platform.

A bracket 50 having a vertically extending portion 51 is fixed to the outer side of plate 37. This bracket carries a bolt 52 which extends through a perforation in the vertical portion 51 of bracket 50 and is threaded into a longitudinally extending boring in a lug 53 extending laterally of and formed integral with cross-head 33. Plate 38 has a U-shaped bracket 55 fixed to the outer side thereof. A bolt 56 extends through a perforation in the middle portion of the bracket and is threaded into a longitudinally extending boring in a lug 57 extending laterally of and formed integral with cross-head 34. By adjusting bolts 52 and 56, the distance between rollers 23 and 24 may be varied to adjust the tension of the canvas belt 21.

The outer ends of slots 35 and 36 are maintained closed by means of a pair of cover plates 58 and 59, the dimensions of which are somewhat greater than those of the slots. These plates are carried by cross-heads 33 and 34 to move therewith, being provided with a perforation 60 near one end through which the cross heads 33 and 35 project.

The driving roller 23 is operated in such direction to cause the upper run of the conveyor 20 to travel toward the left, looking at Figures 2 and 3, thereby causing the conveyor 20 to deliver grain cut by the sickle 19 to that end of the machine. Conveyor 20 deposits grain at the delivery end upon an inclined elevator 61. Occasionally grain is carried around the delivery end of conveyor 20 upon the bottom 12 of the platform and is moved therealong by the lower run of the conveyor 20 towards the opposite end of the conveyor. In order to conduct such grain back upon the top run of the conveyor 20 and at the same time make it possible to expose the end of the conveyor opposite the delivery end to facilitate placing the canvas belt 21 on the rollers 23 and 24, I have provided a shield 65 which is of semi-circular cross-section and extends the full width of the conveyor 25 and is hingedly connected along its lower edge by means of a rod 66 to the end of the platform. Rod 66 is supported on one end on a bracket 67 fixed to and depending from plate 37 and near its other end by means of a strap 68 bent around the rod 66 and looped back upon itself, the ends thereof being fixed to the end frame member 16 by means of bolt 69. Shield 65 is detachably held in operative position against the ends of plates 37 and 38 which are arcuate-shaped, to correspond to the curvature of shield 65.

The means for detachably holding shield 65 in this position comprises a pair of bolts 72 and 73 pivotally connected to plates 37 and 38 by means of pivots 74 and 75, respectively. A pair of brackets 76 and 77 are fixed to opposite ends of shield 65. These brackets have upwardly extending portions 78 and 79 notched as shown at 80 to receive bolts 72 and 73, respectively. Each bolt 72 and 73 is provided with a wing nut 81 and washer 82 adapted to bear upon portions 78 and 79 of brackets 76 and 77 on each side of slots 80. By loosening wing nuts 81, bolts 72 and 73 may be swung upwardly out of slots 80 in brackets 76 and 77 after which shield 65 may be rotated about its hinge connection with bottom 12 into a lowered position below the plane of bottom 12 of the platform, as shown in dotted lines in Figures 2 and 3, to completely expose this end of the conveyor. With shield 65 in this position and this end of the conveyor exposed, the operation of replacing and removing the canvas belt 26 is greatly facilitated.

What I claim as my invention and desire to secure by Letters Patent is:—

1. In a harvesting mechanism comprising a platform having an imperforated bottom, a sickle disposed along the forward side of the platform, and a conveyor disposed on said platform disposed in rear of said sickle and comprising a driving roller and a driven roller at opposite ends of the platform and a belt trained thereover, the upper run of said belt functioning to receive grain cut by said sickle and deliver it to one end of said platform, the ends of said belt being detachably connected, of a shield of substantially semi-circular cross-section pivotally connected along one edge to the bottom of the platform at the end opposite the delivery end to form an upwardly curved continuation thereof to direct grain, carried around the delivery end of the conveyor upon the bottom of said platform and towards the opposite end by the lower run of the conveyor, around the opposite end and upon the upper run of the conveyor, and detachable means for holding said shield in operative position, whereby when said holding means are detached, said shield may be swung downwardly below the plane of the bottom of said platform to facilitate removing and replacing said belt.

2. In a harvesting mechanism comprising a platform having an imperforated bottom, a sickle disposed along the forward side of the platform, and a conveyor on said platform disposed in rear of said sickle and comprising a driving roller and a driven roller at opposite ends of the platform and a belt trained thereover, the upper run of said belt functioning to receive grain cut by said sickle and deliver it to one end of said platform, the ends of said belt being detachably connected, of a shield of substantially semi-circular cross-section connected along one edge to the bottom of the platform at the end opposite the delivery end to form an upwardly curved continuation thereof to direct grain, carried around the delivery end of the conveyor upon the bottom of said platform and towards the opposite end by the lower run of the conveyor, around the opposite end and upon the upper run of the conveyor, and detachable means for holding said shield in operative position, whereby when said holding means are detached, said shield may be displaced to expose the opposite end of the conveyor to facilitate removing and replacing said belt.

RALPH L. ANDERSON.